United States Patent [19]

Chang

[11] Patent Number: 5,713,464
[45] Date of Patent: Feb. 3, 1998

[54] DISC HOLDER

[76] Inventor: Hsin Chiu Chang, No. 9, Her Pin Lane, Ma Hsin Tsuen, Shiu Shuei Hsiang, Chang Hua, Hsien, Taiwan

[21] Appl. No.: 821,271

[22] Filed: Mar. 20, 1997

[51] Int. Cl.[6] .................................................. B65D 85/57

[52] U.S. Cl. .......................... 206/308.1; 206/313; 206/1.5

[58] Field of Search ................................ 206/232, 308.1, 206/309, 310, 311, 312, 313, 1.5; 220/260, 315, 324, 326

[56] References Cited

U.S. PATENT DOCUMENTS 5,244,084  9/1993  Chan ...................................... 206/308.1
5,597,068  1/1997  Weisburn et al. ..................... 206/308.1

Primary Examiner—Jacob K. Ackun

[57] ABSTRACT

A disc holder includes an insert engaged in a base and a cover pivotally coupled to the base for enclosing the insert. A platter is pivotally coupled to the insert for allowing the platter to be rotated into the insert and to be rotated outward of the insert. A latch may secure the platter to the insert for securing the platter to the insert when the platter is engaged in the insert. A spring may rotate the platter outward of the insert. A gear and a pinion may be coupled to the platter for slowing a rotational movement of the platter and for preventing the disc from being damaged.

6 Claims, 5 Drawing Sheets

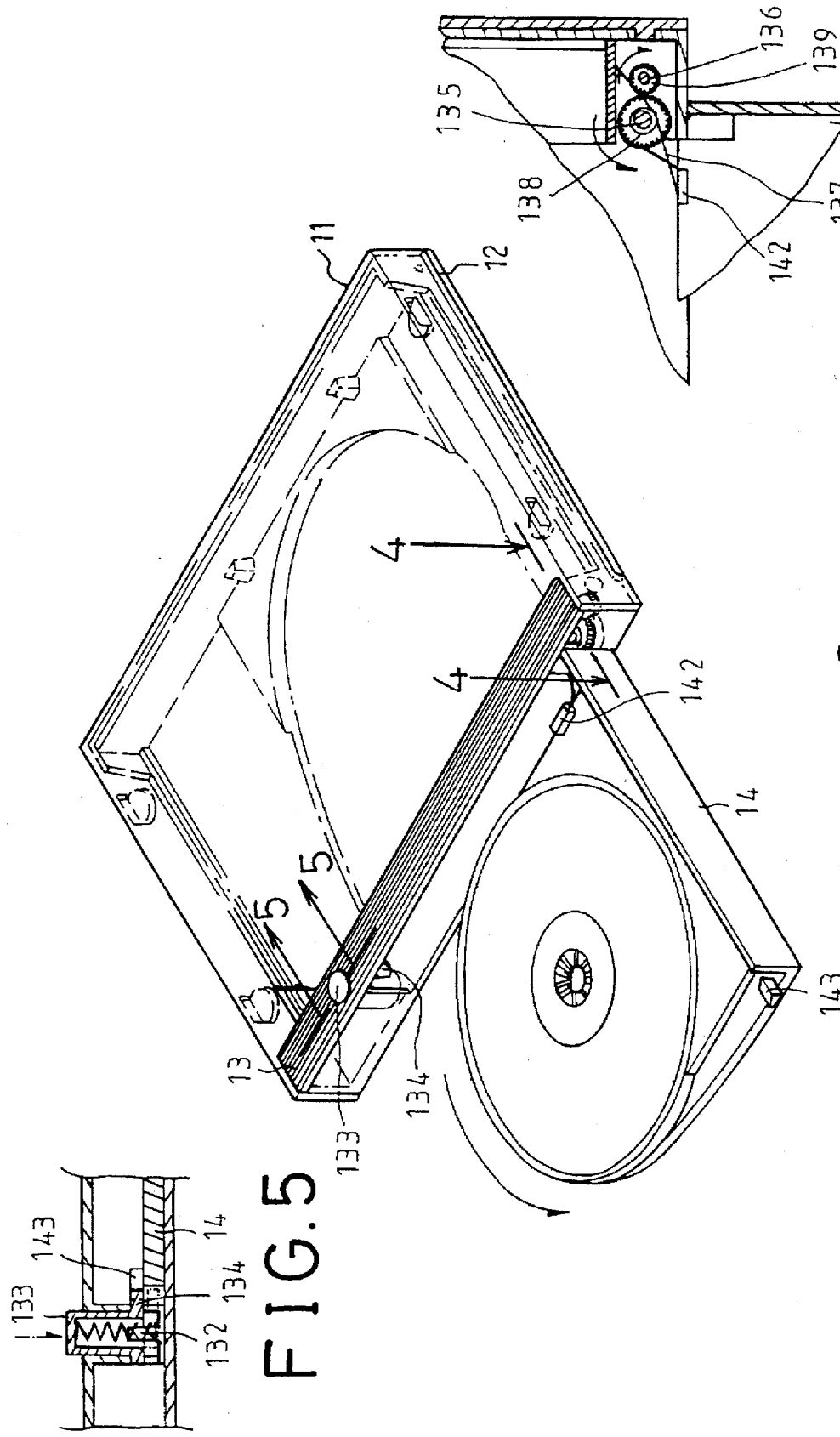

5,713,464

DISC HOLDER

BACKGROUND OF THE INVENTION

1. Field of the Invention

The present invention relates to a holder, and more particularly to a disc holder.

2. Description of the Prior Art

Typical disc holders comprise an insert disposed in a base for receiving a disc and a cover pivotally secured to the base for fetching the disc. Some of the disc holders include an insert that may be slided outward of the holder. However, none of the arts disclose an insert that is rotatably engaged in the holder and that may be rotated outward of the holder.

The present invention has arisen to mitigate and/or obviate the afore-described disadvantages of the conventional disc holders.

SUMMARY OF THE INVENTION

The primary objective of the present invention is to provide a disc holder which includes a platter that may be rotated inward and outward of the holder for easily storing and obtaining the disc.

In accordance with one aspect of the invention, there is provided a disc holder comprising a base, an insert engaged in the base and including an opening, a cover pivotally coupled to the base for enclosing the insert, a platter pivotally coupled to the insert at a pivot shaft for allowing the platter to be rotated into the opening of the insert and to be rotated outward of the insert about the pivot shaft, and means for latching the platter and for securing the platter to the insert when the platter is engaged in the opening of the insert. The platter may be rotated outward of the base and the insert for allowing the disc to be easily engaged into and disengaged from the platter.

A spring means is further provided for rotating the platter outward of the insert and for allowing the platter to be automatically biased outward of the insert by the spring.

A gear is secured to the pivot shaft, and a pinion is rotatably secured to the insert for engaging with the gear and for slowing a rotational movement of the platter and for preventing the disc from being damaged while the platter is suddenly opened.

The insert includes a cavity, the platter includes a catch, the catching means includes a button slidably engaged in the cavity and having a projection for engaging with the catch, and means for biasing the projection to engage with the catch and for maintaining the platter in the opening of the insert. The projection may be easily disengaged from the catch by depressing the button against the biasing means.

The catching means includes a catch formed on the platter, a button laterally and slidably engaged in the insert and having a projection for engaging with the catch, and means for biasing the projection of the button to engage with the catch and for maintaining the platter in the opening of the insert. The projection may be easily disengaged from the catch by depressing the button against the biasing means.

The button includes an extension extended laterally outward of the insert and the base, and a knob secured to the extension for disengaging the projection from the catch. The knob is provided in the side portion of the disc holder such that the knob and the button may be prevented from being depressed against the spring biasing means inadvertently.

Further objectives and advantages of the present invention will become apparent from a careful reading of a detailed description provided hereinbelow, with appropriate reference to accompanying drawings.

BRIEF DESCRIPTION THE DRAWINGS

FIGS. 2 and 3 are perspective views of the disc holder, illustrating the operation of the disc holder;

Figure 1:
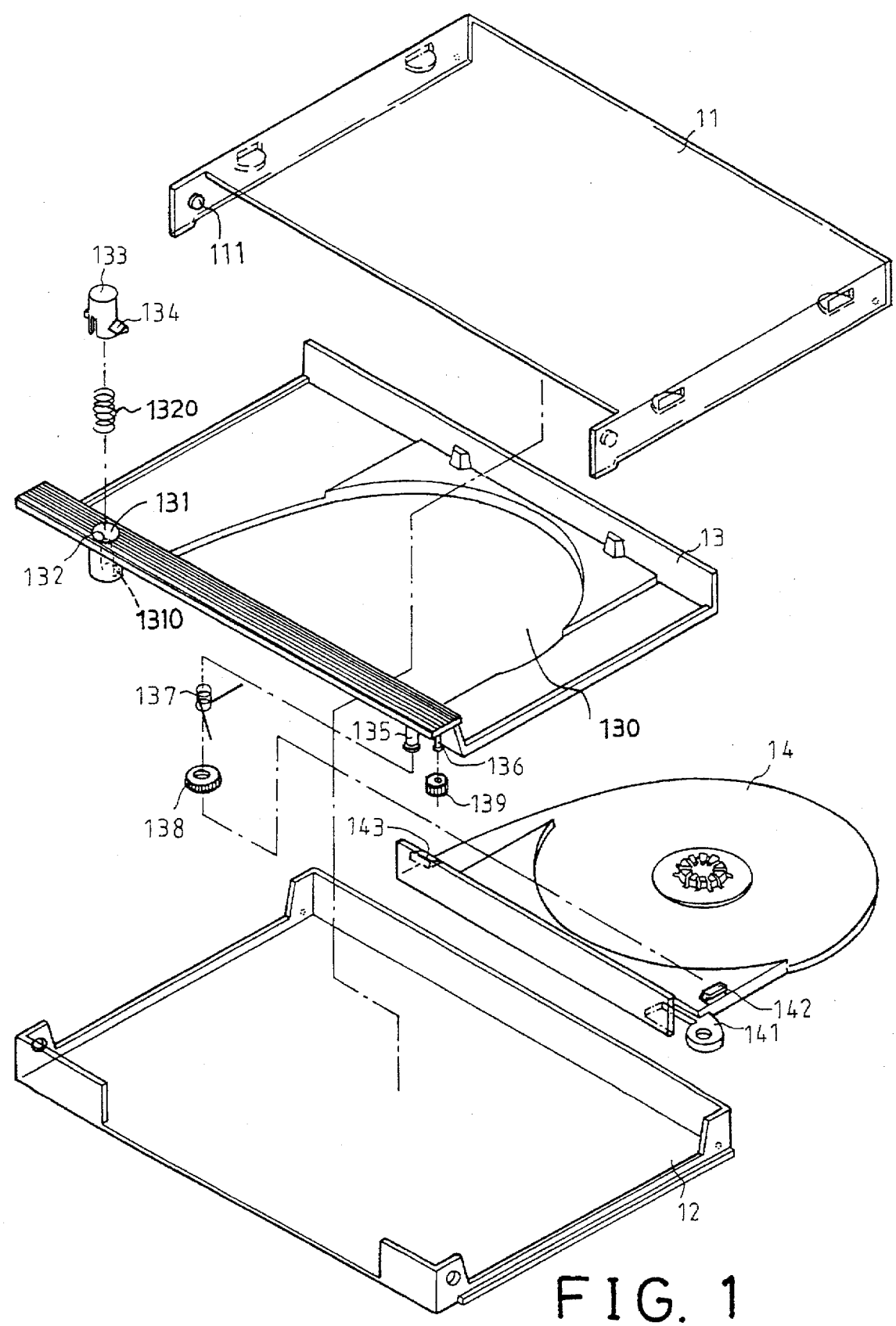
FIG. 1 is an exploded view of a disc holder accordance with the present invention.
Figure 2:
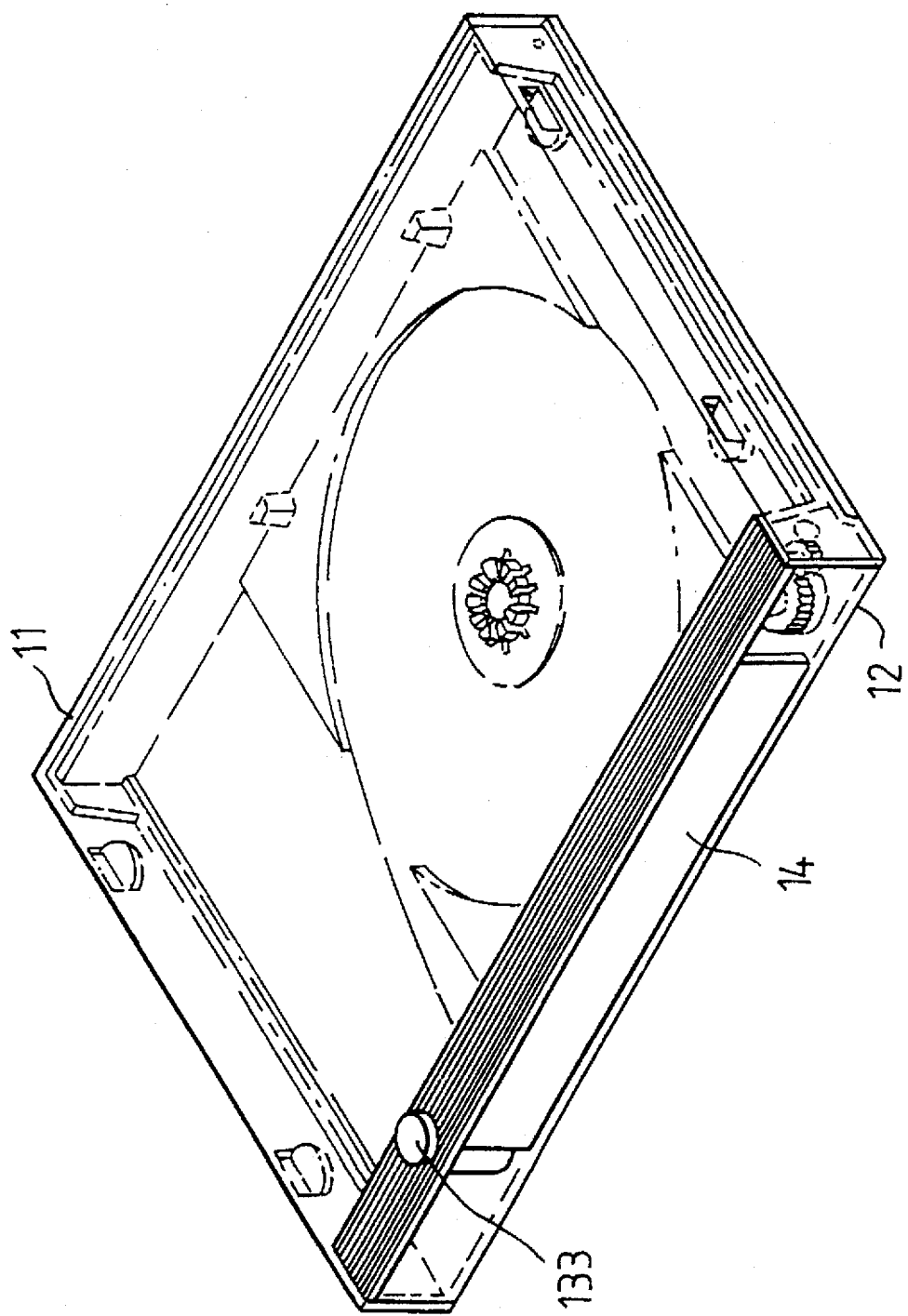
Figure 6:
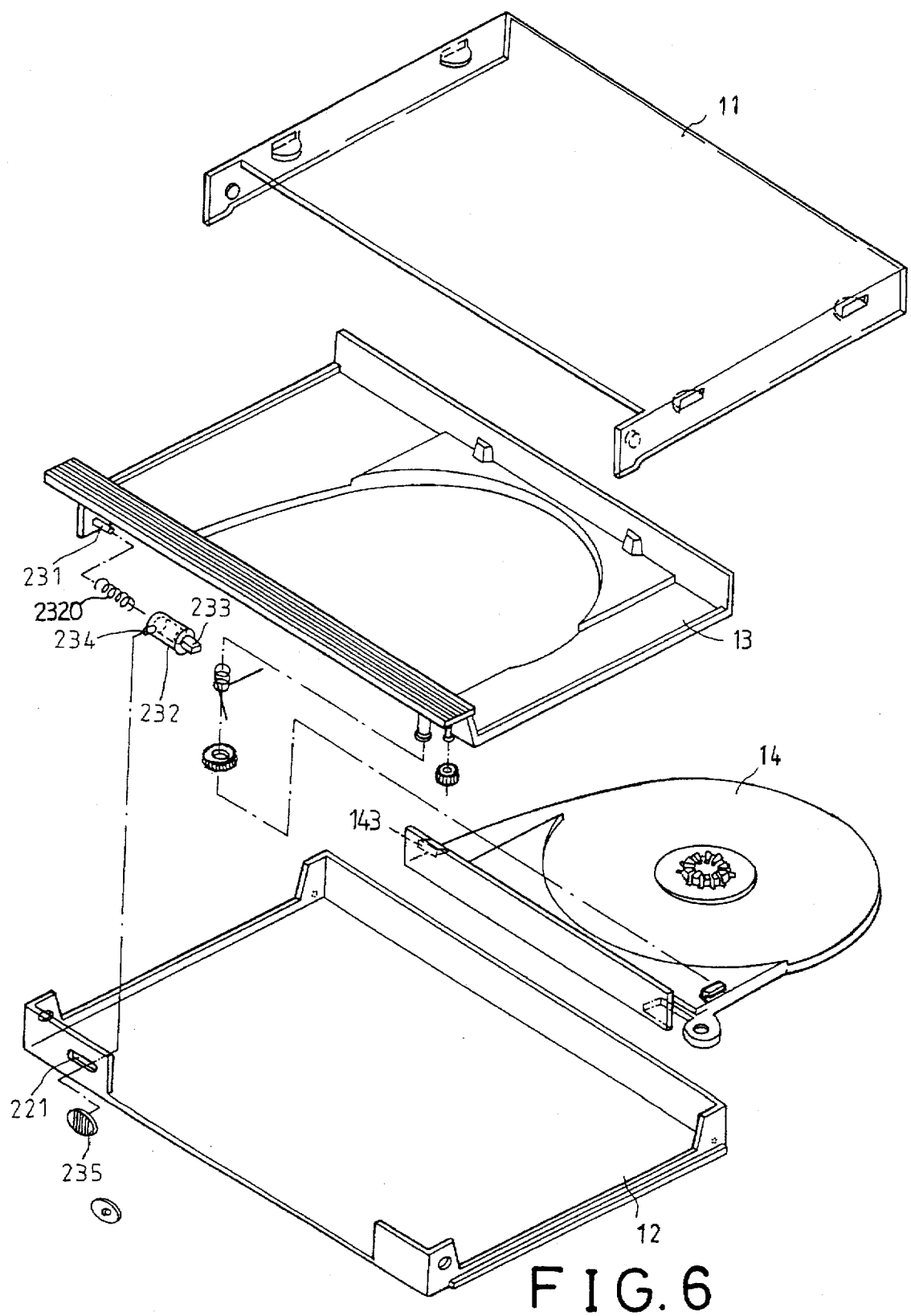

FIGS. 4 and 5 are cross sectional views taken along lines 4—4 and 5—5 of FIG. 3 respectively;

FIG. 6 is an exploded view showing another application of the disc holder; and

Figure 7:
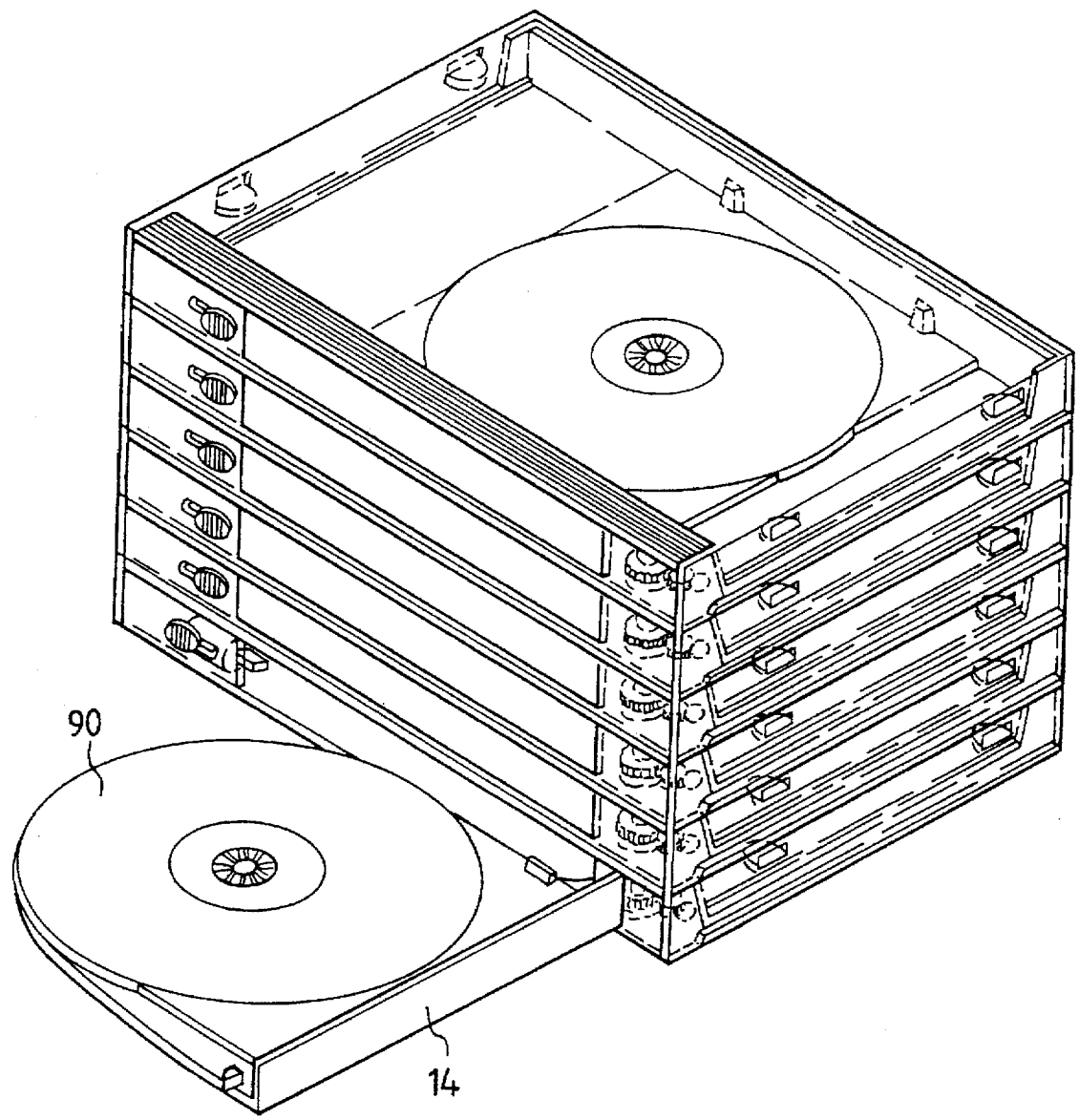

FIG. 7 is a perspective view showing the application of the disc holder as shown in FIG. 6.

DETAILED DESCRIPTION OF THE PREFERRED EMBODIMENT

Referring to the drawings, and initially to FIGS. 1–5, a disc holder in accordance with the present invention comprises an insert 13 engaged in a base 12 for receiving a disc, and a cover 11 pivotally coupled to the base 12 at a pivot pin 111 for allowing the cover 11 to be rotated relative to the base 12 about the pivot pin 111 and for allowing the disc to be engaged into and disengaged from the insert 13. The insert 13 includes a shaft 135 and an axle 136. A gear 138 is secured to the shaft 135 and a pinion 139 is rotatably engaged on the axle 136 and engaged with the gear 138. A platter 14 includes an ear 141 rotatably engaged on the shaft 135 for allowing the platter 14 to be rotated about the shaft 135. The insert 13 includes an opening 130 for receiving the platter 14. The platter 14 includes a stop 142 and a catch 143. A spring 137 is engaged on the shaft 135 and has one end engaged with the stop 142 and has the other end engaged with the insert 13 for biasing the platter 14 to rotate outward of the insert 13 and the base 12. The insert 13 includes a cavity 131 for slidably receiving a spring 1320 and a button 133 and includes a post 132 extended in the cavity 131 for engaging with the spring 1320. The button 133 includes a projection 134 slidably engaged in a slot 1310 of the insert 13 for engaging with the catch 143 of the platter 14 (FIGS. 3, 5).

In operation, the projection 134 of the button 133 may be biased to engage with the catch 143 of the platter 14 by the spring 1320 (FIG. 5) for maintaining the platter 14 in the insert 13. The projection 134 may be disengaged from the catch 143 by depressing the button 133 against the spring 1320 for allowing the platter 14 to be biased outward of the insert 13 by the spring 137. It is to be noted that the shaft 135 and the pin 136 may be provided on the base 12 instead of on the insert 13. The engagement of the gear 138 and the pinion 139 (FIG. 4) may slow the rotational movement of the platter 14 and may prevent the disc from being hurt while the platter 14 is suddenly opened. For safety purposes, the insert 13 may include a depression for receiving the top of the button 133 and for preventing the button 133 from extending upward beyond the upper surface of the insert 13 and for preventing the button 133 from being depressed inadvertently.

Alternatively, as shown in FIGS. 6 and 7, the button 232 may be disposed laterally and includes a projection 233 biased to engage with the catch 143 of the platter 14 by the spring 2320 which is engaged with a post 231 of the insert 13. The button 232 includes an extension 234 extended outward through a groove 221 of the base 12 for engaging with a knob 235 which may be used for disengaging the projection 233 from the catch 143 of the platter 14. The knob 235 is provided in the side portion of the disc holder and may thus be prevented from being depressed inadvertently by the other disc holders. The platter 14 and the disc 90 of each of the disc holders may be easily rotated outward of the disc holder (FIG. 7)

Accordingly, the disc holder in accordance with the present invention includes a platter that may be rotated inward and outward of the holder for easily storing and obtaining the disc.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A disc holder comprising:

a base, an insert engaged in said base and including an opening, a cover pivotally coupled to said base for enclosing said insert, a platter pivotally coupled to said insert at a pivot shaft for allowing said platter to be rotated into said opening of said insert and to be rotated outward of said insert about said pivot shaft, and means for latching said platter and for securing said platter to said insert when said platter is engaged in said opening of said insert.

2. A disc holder according to claim 1 further comprising means for rotating said platter outward of said insert.

3. A disc holder according to claim 1 further comprising a gear secured to said pivot shaft, and a pinion rotatably secured to said insert for engaging with said gear and for slowing a rotational movement of said platter.

4. A disc holder according to claim 1, wherein said insert includes a cavity, said platter includes a catch, said latching means includes a button slidably engaged in said cavity and having a projection for engaging with said catch, and means for biasing said projection to engage with said catch and for maintaining said platter in said opening of said insert.

5. A disc holder according to claim 1, wherein said latching means includes a catch formed on said platter, a button laterally and slidably engaged in said insert and having a projection for engaging with said catch, and means for biasing said projection of said button to engage with said catch and for maintaining said platter in said opening of said insert.

6. A disc holder according to claim 5, wherein said button includes an extension extended laterally outward of said insert and said base, and a knob secured to said extension for disengaging said projection from said catch.

* * * * *